US006580445B2

(12) United States Patent
Lai

(10) Patent No.: US 6,580,445 B2
(45) Date of Patent: Jun. 17, 2003

(54) PRINTING HEAD STRUCTURE OF LARGE-SIZE DRAFTING MACHINE

(75) Inventor: Jin-Sheng Lai, Taipei Hsien (TW)

(73) Assignee: Great Computer Corp., Taipei Hsien (TW)

( * ) Notice: Subject to any disclaimer, the term of this patent is extended or adjusted under 35 U.S.C. 154(b) by 0 days.

(21) Appl. No.: 09/754,337

(22) Filed: Jan. 5, 2001

(65) Prior Publication Data

US 2002/0089581 A1 Jul. 11, 2002

(51) Int. Cl.[7] ......................... G01D 15/10; G01D 15/16

(52) U.S. Cl. ........................ 347/197; 347/198; 347/214

(58) Field of Search ................................ 347/222, 191, 347/197–198, 214, 176; 400/208, 240.3, 247, 207, 120.17, 634, 120.16; 242/169–170, 324.2

(56) References Cited

U.S. PATENT DOCUMENTS 4,653,939 A * 3/1987 Hibino .................. 400/120.16
5,104,247 A * 4/1992 Ohshima ................. 400/240.3
5,173,718 A * 12/1992 Takayama et al. .......... 347/197
5,383,733 A * 1/1995 Zinsmeyer et al. ......... 400/208
5,405,205 A * 4/1995 Venthem et al. ............ 400/634
5,491,504 A * 2/1996 Grellman .................... 347/176
5,678,938 A * 10/1997 Saito et al. ............ 400/120.17
6,250,824 B1 * 6/2001 Ogiyama .................... 347/172

* cited by examiner

*Primary Examiner*—Lamson Nguyen
*Assistant Examiner*—K. Feggins
(74) *Attorney, Agent, or Firm*—Varndell & Varndell, PPLLC

(57) ABSTRACT

Printing head structure of large-size drafting machine, including a printing box movably retained on rails. The printing box has a receptacle in which a reel-type color cartridge is positioned. The box body is formed with a window at a printing position. A printing head is disposed in the box body. Two sides of the printing head are equipped with linear bearings. A shaft fitted in a spring is fitted in and supported by the bearing. Multiple electric heaters as printing points and heat-radiators are disposed under the printing head. A vertically movable cam driving mechanism is disposed above the printing head. According to received drafting signals, the color belts are rolled for selecting points and heating the points so as to print a picture.

3 Claims, 6 Drawing Sheets

PRINTING HEAD STRUCTURE OF LARGE-SIZE DRAFTING MACHINE

BACKGROUND OF THE INVENTION

The present invention is related to an improved printing head structure of large-size drafting machine. The cost for the outputting device of the drafting machine is reduced so that the printing cost is lowered and a real remote visual effect can be achieved.

Various kinds of computerized printers are commercially available nowadays. It is known that a personal color ink-injecting printer is quite cheap and has high resolution. When co-used with a relevant image software, the printer can print a picture with high picture quality. However, this is limited to small-size print material. With respect to ink-injecting drafting machine for large-size picture, the requirement for high resolution and pixel leads to high technique and high price In addition, not all the large-size printing materials necessitate high picture quality. For example, the canvas-made commercial signs are mostly hung high above. Therefore, even if the printed picture has relatively coarse particles, the message presented thereby will make no difference to the sight of a common person. Therefore, in the case that such picture is printed with the existent high quality ink-injecting printer, the cost will be relatively high and the competitive ability on the market will be reduced.

SUMMARY OF THE INVENTION

It is therefore a primary object of the present invention to provide an improved printing head structure of large-size drafting machine. The cost for the outputting device of the drafting machine is reasonable and the printing cost is lowered, while a real remote visual effect can be still achieved.

It is a further object of the present invention to provide the above improved printing head structure of large-size drafting machine, in which the printing head can be accurately ascended/descended and located.

It is still a further object of the present invention to provide the above improved printing head structure of large-size drafting machine, in which the color cartridge can be easily received and rolled.

It is still a further object of the present invention to provide the above improved printing head structure of large-size drafting machine, in which a torque limiter is used to protect the color belt from being torn apart.

According to the above objects, the printing head structure of large-size drafting machine of the present invention includes a printing box movably retained on rails. The printing box has a receptacle in which a reel-type color cartridge is positioned. The box body is formed with a window at a printing position. A printing head is disposed in the box body. Two sides of the printing head are equipped with linear bearings. A shaft fitted in a spring is fitted in and supported by the bearing. Multiple electric heaters as printing points and heat-radiators are disposed under the printing head. A vertically movable cam driving mechanism is disposed above the printing head. According to received drafting signals, the color belts are rolled for selecting points and heating the points so as to print a picture.

The present invention can be best understood through the following description and accompanying drawings wherein:

DETAILED DESCRIPTION OF THE PREFERRED EMBODIMENTS

Figure 1:
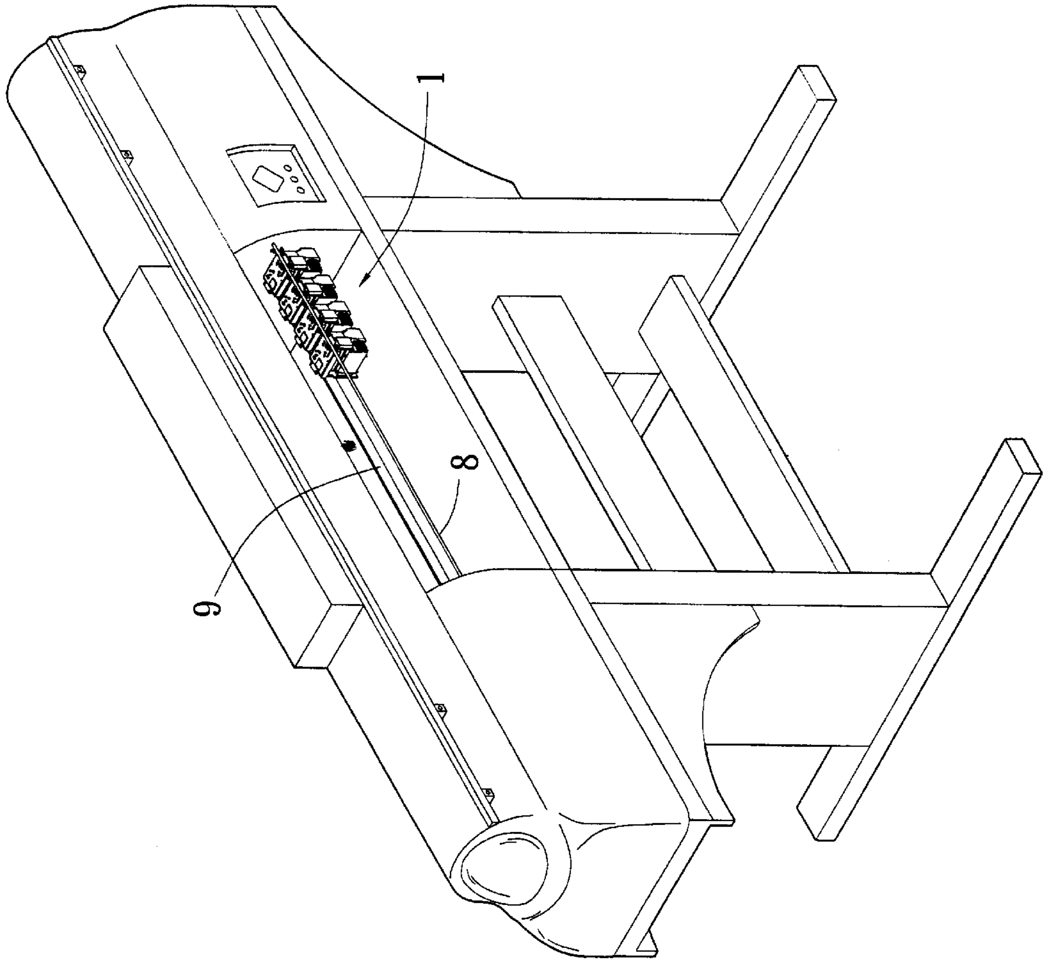
FIG. 1 is a perspective assembled view of the large-size drafting machine of the present invention.
Figure 2:
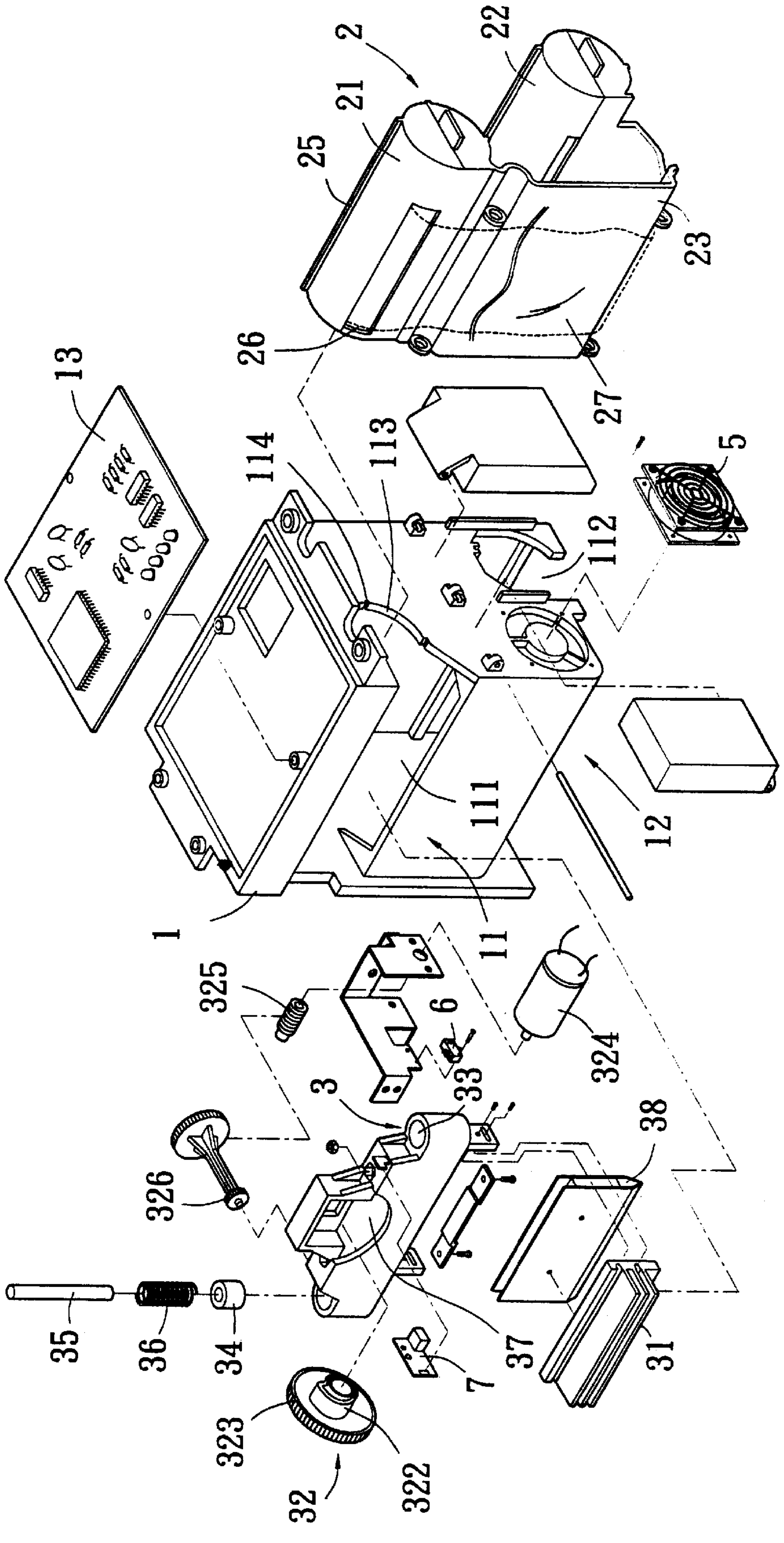
FIG. 2 is a perspective exploded view of the large-size drafting machine of the present invention.
Figure 3:
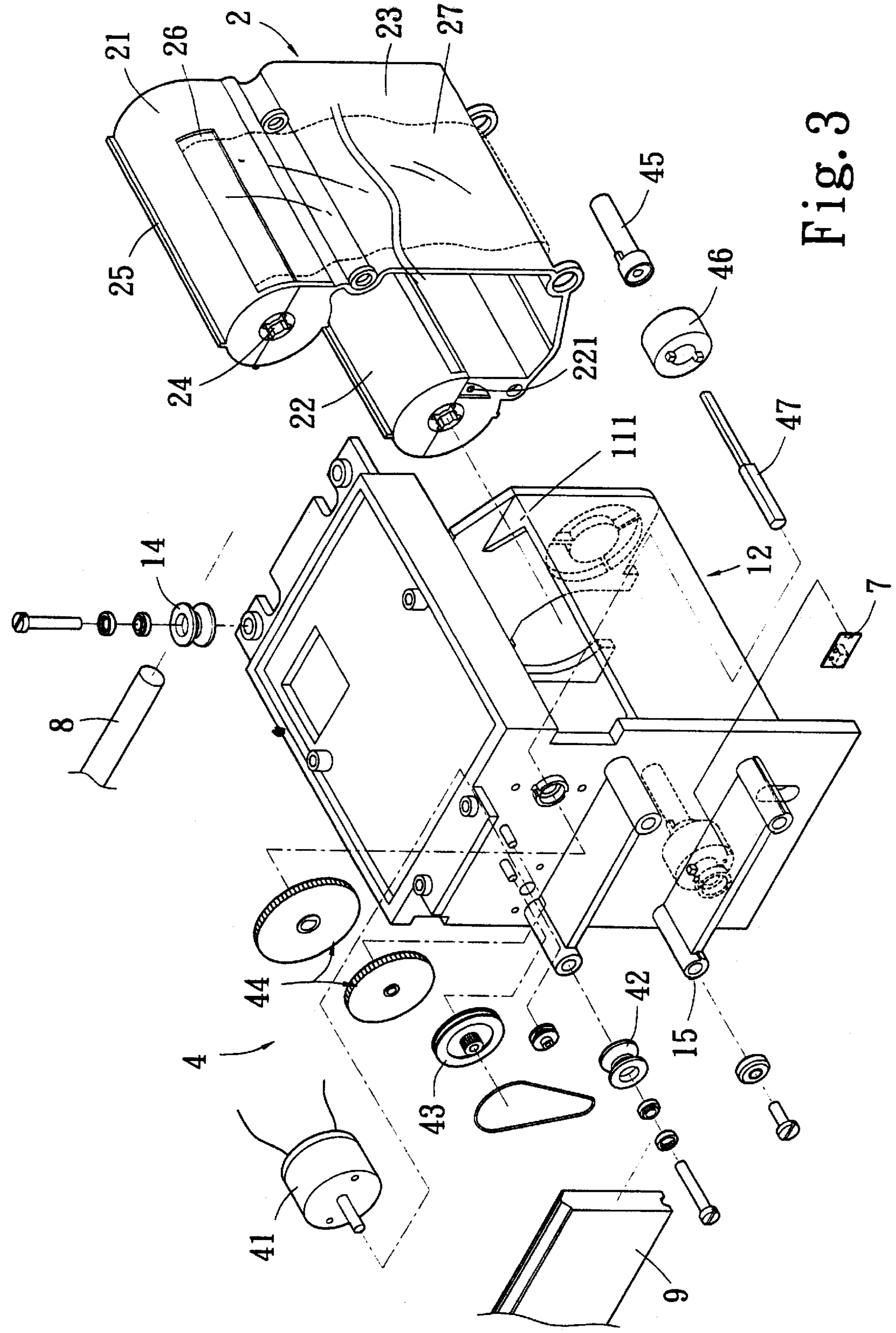
FIG. 3 is a perspective exploded view of the large-size drafting machine of the present invention, seen in another direction.

Please refer to FIGS. 1 to 3. The printing head structure of large-size drafting machine of the present invention includes a printing box 1 movably retained on rails 8, 9. The printing box 1 has a receptacle 11 in which a reel-type color cartridge 2 is positioned. The box body is formed with a window 12 at a printing position. A printing head 3 is disposed in the box body. Multiple electric heaters 38 as printing points and heat-radiators 31 are disposed under the printing head. A vertically movable cam driving mechanism 32 is disposed above the printing head. According to received drafting signals, the color belt can be rolled for selecting points to be heated so as to print the picture.

The printing box 1 is a rectangular body on which a circuit board 13 is disposed. Rollers 14, 15 are mounted on two adjacent walls of the box body for running along the rails 8, 9. The color cartridge receptacle 11 is composed of a front cavity 111 and a bottom cavity 112 formed on opposite corners of the box body. The cavities have smaller openings and larger interiors. One end of each of the cavities is open, while the other end thereof is close. The open end 113 is substantially circular and the periphery of the open end 113 is formed with a small notch 114. The color cartridge 2 is aimed at the notch 114 and placed into the receptacle 11.

The color cartridge 2 is composed of two spaced cylinders 21, 22 and an L-shaped plate 23 connected between the cylinders 21, 22. Each cylinder has a rotary shaft 24 at the center. In addition, the body of the cylinder is formed with ribs 25 aimed at the notch 114 of the open end 113. The circumference of each of the cylinders 21, 22 is formed with a perforation 26 for a color belt 27 to pass therethrough. In addition, an orifice is formed beside the rotary shaft 24 of one cylinder 22, in which a counter 221 is disposed.

The printing head 3 is positioned under the front cavity 111. The printing head 3 is substantially T-shaped. Two sides of the printing head 3 are formed with tunnels 33 in which linear bearings 34 are disposed. A shaft 35 fitted in a spring 36 is fitted in and supported by the bearing 34. The upper portion of the printing head is formed with a chamber 37 having an opening on one side. The cam driving mechanism 32 is positioned in the chamber 37. The cam driving mechanism 32 includes a cam 322, a coaxial gear 323, a spiral rod 325, a T-shaped coaxial gear 326 and a motor 324. The motor 324 drives the spiral rod 325 which via the T-shaped gear 326 drives the gear 323 and the cam 322.

Figure 4:
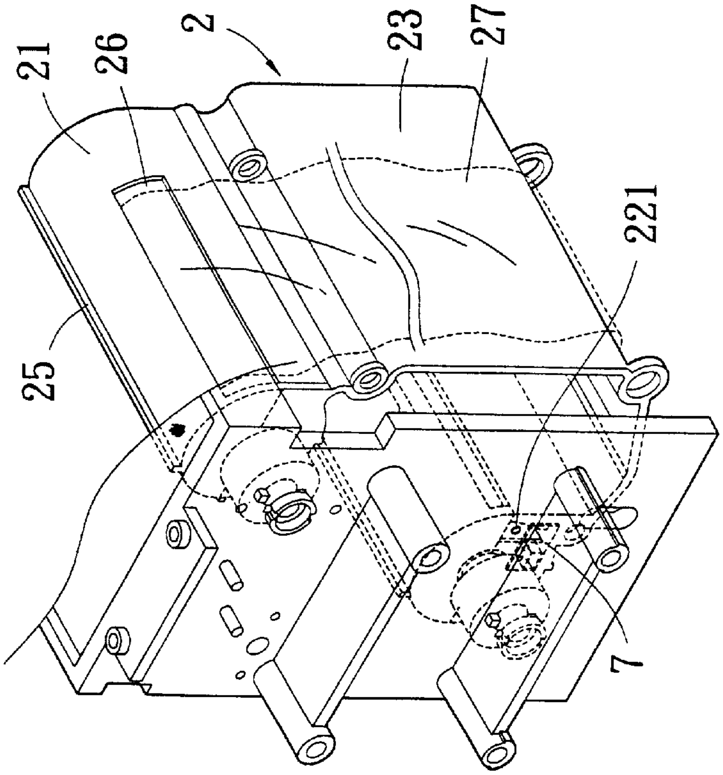
FIG. 4 is a perspective assembled view of the printing head of the present invention.

The present invention further includes a rolling mechanism 4 disposed at the close end of the cavity 111. A motor 41 drives pulleys 42, 43 which drive a gear set 44 to drive two rotary shafts 45 inward projecting from the close end. The rotary shaft 45 is fitted with a torque limiter 46 and a stepped shaft rod 47 and then fitted into the rotary shaft 24 of the color cartridge 2. In case that the color belt 27 is clogged, the torque limiter 46 will make the rotary shaft 45 idle so as to protect the color cartridge 2 and prevent the color belt 27 from being broken. A photosensor 7 is disposed beside the torque limiter 46 in alignment with the counter 221 of the cylinder 22 for measuring the rotational number of the color cartridge 2 as shown in FIG. 4.

Preferably, a heat-radiating fan 5 is added to one side of the printing box 1 and a microswitch 6 and a photosensor 7 are disposed between the printing box 1 and the printing head 3 for detecting the location of the printing head 3.

Figure 5:
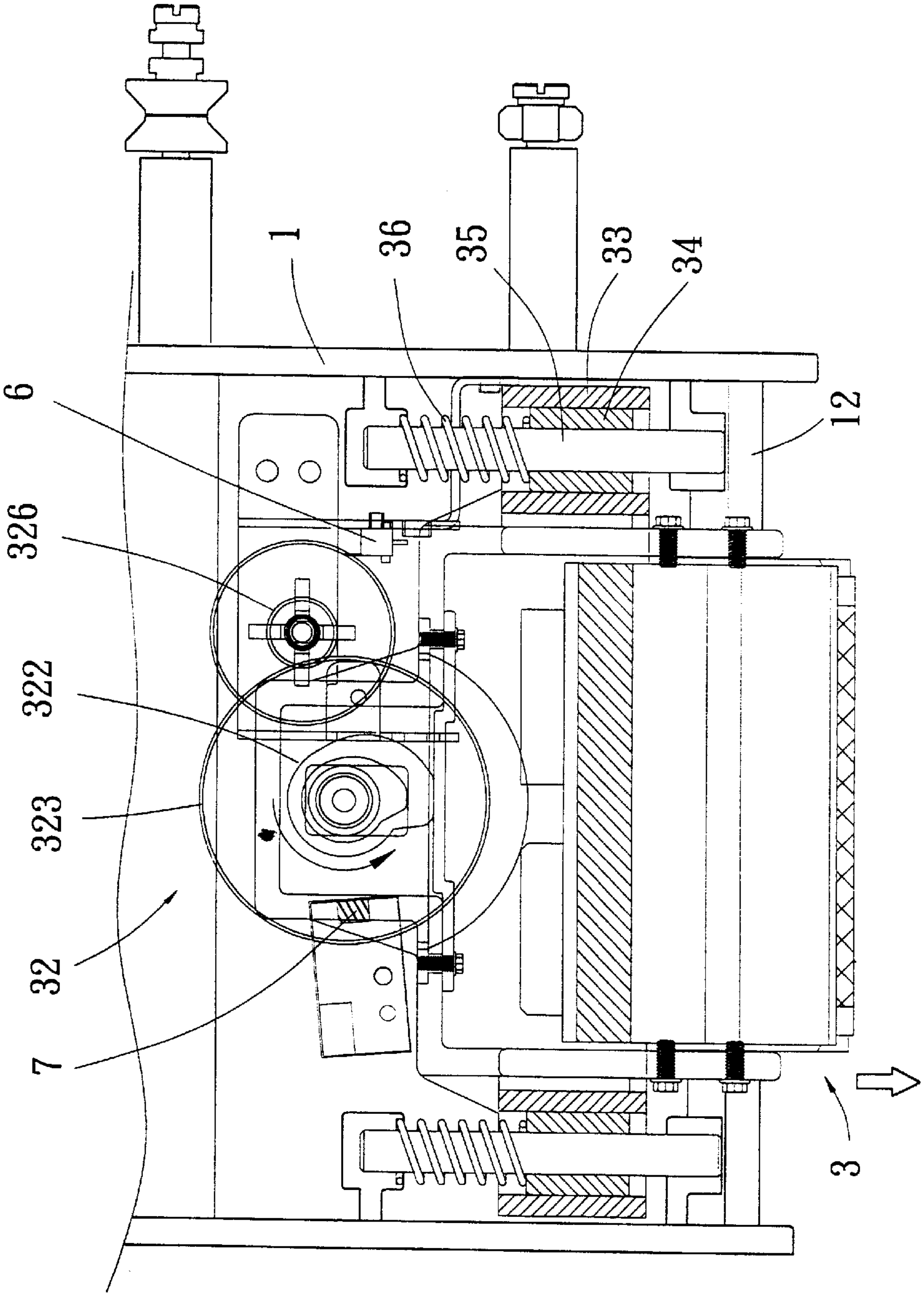
FIG. 5 is a partially sectional assembled view of the printing head of the present invention.
Figure 6:
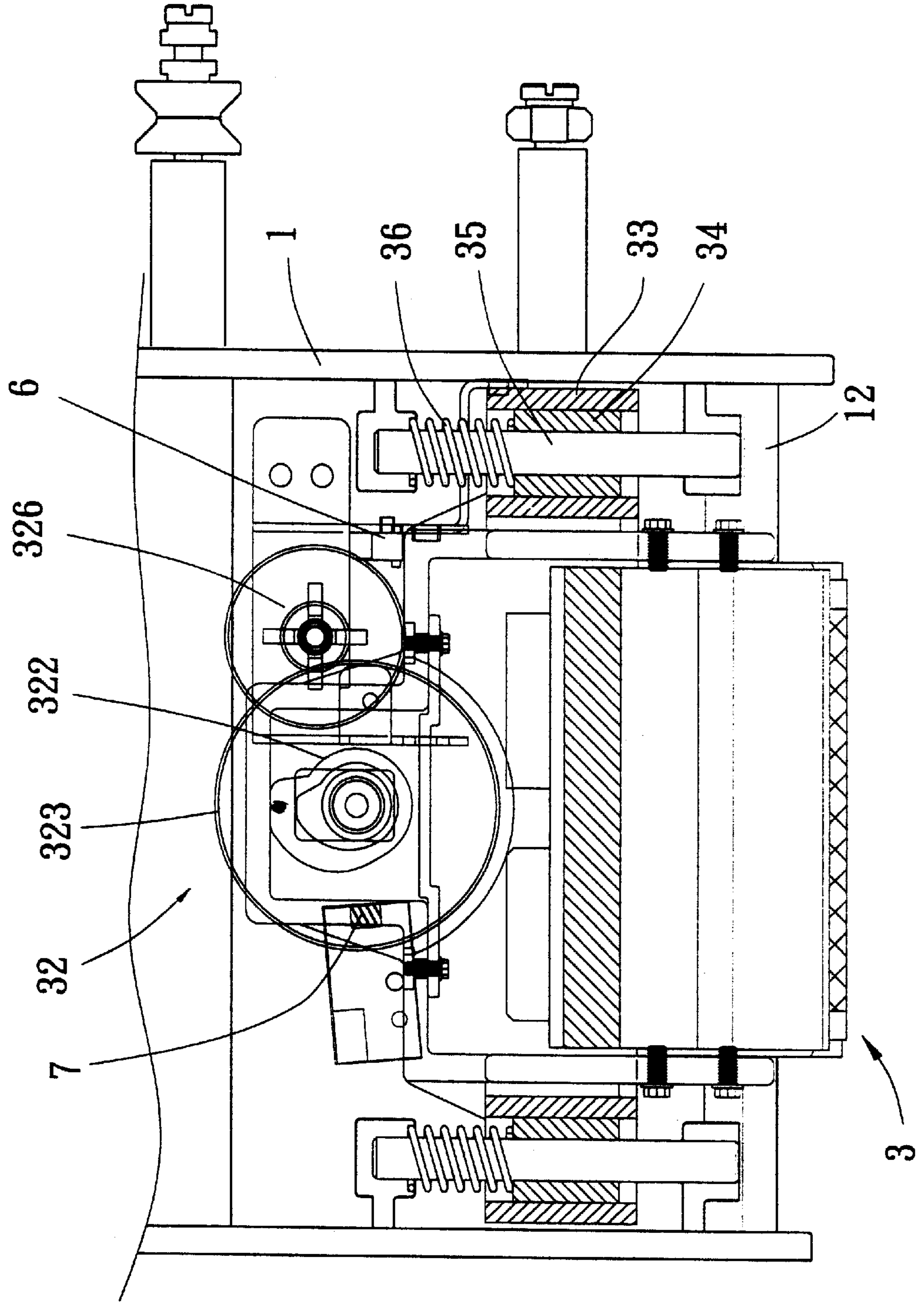
FIG. 6 is a partially sectional assembled view of the printing head of the present invention, showing the operation thereof.

According to the above arrangement, three or four printing boxes 1 with different colors can be at the same time side by side arranged on the rails 8, 9 of the drafting machine. The printing boxes 1 according to the received color-rendering signals select points of the rolled color belts and heat the points for printing a picture. FIGS. 5 and 6 show the operation thereof. In normal state, the printing head 3 is retained by the spring 36 to be adjacent to the color belt of the color cartridge 2. When outputting a certain point, the corresponding electric heater 38 heats the color belt to print on the face of an article. The heat-radiator 31 serves to radiate the heat. When not printed, the cam 322 of the cam driving mechanism 32 operates to lift the printing head 3 for easy removal of the printing box 1. At the same time, the microswitch 6 and the photosensor 7 are used to detect the location of the printing box 1 for a controlling center to read. The functions of the drafting machine is effectively combined so that the cost for the outputting device of the drafting machine is reduced and a real remote visual effect can be achieved.

The above embodiments are only used to illustrate the present invention, not intended to limit the scope thereof. Many modifications of the above embodiments can be made without departing from the spirit of the present invention.

What is claimed is:

1. The printing head structure of large-size drafting machine, comprising a printing box movably retained on rails, the printing box having a receptacle in which a reel-type color cartridge is positioned, a box body being formed with a window at a printing position, a printing head being disposed in the box body, two sides of the printing head being equipped with linear bearings, a shaft fitted in a spring being fitted in and supported by the linear bearings, multiple electric heaters as printing points and heat-radiators being disposed under the printing head, a vertically movable cam driving mechanism being disposed above the printing head, whereby according to received drafting signals, the color belts are rolled for selecting points and heating the points so as to print a picture, and the printing box further being a rectangular body on which a circuit board is disposed, rollers being mounted on two adjacent walls of the box body for running along the rails, the color cartridge receptacle being composed of a front cavity and a bottom cavity formed on opposite corners of the box body, the cavities having smaller openings and larger interiors, one end of each of the cavities being open, while the other end thereof being closed, the open end being substantially circular and a periphery of the open end being formed with a small notch, the color cartridge being aimed at the notch and placed into the receptacle;

the color cartridge further being composed of two spaced cylinders and an L-shaped plate connected between the cylinders, each cylinder having a rotary shaft at the center, a body of the cylinder being formed with ribs aimed at the notch of the open end, a circumference of each of the cylinders being formed with a perforation;

a rolling mechanism being disposed at the closed end of the cavity, the rolling mechanism including a motor and pulleys driven by the motor to drive a gear set to drive two rotary shafts inwardly projecting from the closed end, the rotary shaft being fitted with a torque limiter; and the printing head being positioned under the front cavity, the printing head being substantially T-shaped, two sides of the printing head being formed with tunnels in which the linear bearings are disposed, an upper portion of the printing head being formed with a chamber having an opening on one side, the printing head being formed with a chamber having an opening on one side, the cam driving mechanism being positioned in the chamber, the cam driving mechanism including a cam, a coaxial gear, a spiral rod, a T-shaped coaxial gear and a motor, the motor driving the spiral rod which via the T-shaped coaxial gear drives the gear and the cam.

2. The printing head structure of large-size drafting machine as claimed in claim 1, wherein a counter is disposed beside the rotary shaft of the cylinder of the color cartridge.

3. The printing head structure of large-size drafting machine as claimed in claim 1, wherein a photosensor is disposed beside the torque limiter of the rolling mechanism.

* * * * *